United States Patent
Louizos et al.

(10) Patent No.: US 11,562,208 B2
(45) Date of Patent: Jan. 24, 2023

(54) CONTINUOUS RELAXATION OF QUANTIZATION FOR DISCRETIZED DEEP NEURAL NETWORKS

(71) Applicant: QUALCOMM Incorporated, San Diego, CA (US)

(72) Inventors: Christos Louizos, Utrecht (NL); Matthias Reisser, Weesp (NL); Tijmen Pieter Frederik Blankevoort, Amsterdam (NL); Max Welling, Bussum (NL)

(73) Assignee: Qualcomm Incorporated, San Diego, CA (US)

( * ) Notice: Subject to any disclaimer, the term of this patent is extended or adjusted under 35 U.S.C. 154(b) by 781 days.

(21) Appl. No.: 16/413,535

(22) Filed: May 15, 2019

(65) Prior Publication Data

US 2019/0354842 A1    Nov. 21, 2019

(30) Foreign Application Priority Data

May 17, 2018   (GR) .............................. 20180100211

(51) Int. Cl.
  *G06N 3/04*   (2006.01)
  *G06N 3/08*   (2006.01)
  *G06F 17/18*  (2006.01)

(52) U.S. Cl.
  CPC ........... *G06N 3/0472* (2013.01); *G06F 17/18* (2013.01); *G06N 3/084* (2013.01)

(58) Field of Classification Search
  CPC ....... G06N 3/0472; G06N 3/084; G06F 17/18
  See application file for complete search history.

(56) References Cited

U.S. PATENT DOCUMENTS

| 9,916,531 | B1  |  3/2018 | Zivkovic et al. |
| 10,678,508 | B2* |  6/2020 | Vantrease ............... G06F 17/15 |
| 2007/0078401 | A1 |  4/2007 | Servoss |
| 2016/0217369 | A1 |  7/2016 | Annapureddy et al. |
| 2016/0328645 | A1* | 11/2016 | Lin ........................ G06N 3/063 |
| 2016/0328646 | A1* | 11/2016 | Lin ..................... G06K 9/4628 |
| 2016/0328647 | A1* | 11/2016 | Lin ........................ G06N 3/063 |
| 2017/0169327 | A1 |  6/2017 | Nestler et al. |
| 2017/0286830 | A1* | 10/2017 | El-Yaniv .............. G06N 3/0481 |

FOREIGN PATENT DOCUMENTS

CN            107340993 A       11/2017

OTHER PUBLICATIONS

Gupta et al., Deep Learning With Limited Numerical Precision, 32nd International Conference On Machine Learning, 2015 (Year: 2015).*

(Continued)

*Primary Examiner* — Raymond L Nimox
(74) *Attorney, Agent, or Firm* — Seyfarth Shaw LLP

(57) ABSTRACT

A method for quantizing a neural network includes modeling noise of parameters of the neural network. The method also includes assigning grid values to each realization of the parameters according to a concrete distribution that depends on a local fixed-point quantization grid and the modeled noise and. The method further includes computing a fixed-point value representing parameters of a hard fixed-point quantized neural network.

25 Claims, 9 Drawing Sheets

(56) References Cited

OTHER PUBLICATIONS

Jang et al., Categorical Reparameterization With Gumbel-Softmax, ICLR. 2017 (Year: 2017).*
International Search Report and Written Opinion—PCT/US2019/032732—ISA/EPO—dated Aug. 22, 2019.
Jang E., et al., "Categorical Reparameterization with Gumbel-Softmax," arxiv.org, Cornell University Library, 201 Olin Library Cornell University Ithaca, NY 14853, Nov. 3, 2016, XP080729237, 12 Pages, abstract; figures 1-5, p. 1, line 1—p. 8, last line.
Louizos C., et al., "Relaxed Quantization for Discretized Neural Networks," arxiv.org. Cornell University Library, 201 Olin Library Cornell University Ithaca, NY 14853, Oct. 3, 2018, XP081057162, 14 pages, abstract; figures 1-4 p. 1, line 1—p. 8, last line.
Maddison C.J., et al., "The Concrete Distribution: A Continuous Relaxation of Discrete Random Variables," arxiv.org, Cornell University Library, 201 Olin Library Cornell University Ithaca, NY 14853, Nov. 2, 2016, XP080729141, 17 Pages, abstract; figures 1-4 p. 1, line 1—p. 9, last line.
Mnih A., et al., "Variational Inference for Monte Carlo Objectives," arxiv.org, Cornell University Library, 201 Olin Library Cornell University Ithaca, NY 14853, Feb. 22, 2016, XP080685131, 11 pages, Abstract p. 1, left-hand column, line 1—p. 6, right-hand column, last line.
Zhou W., et al., "Compressibility and Generalization in Large-scale Deep Learning," arxiv.org, Cornell University Library, 201 Olin Library Cornell University Ithaca, NY 14853, Apr. 16, 2018, XP080871339, 20 pages, abstract p. 7, line 1—p. 8, line 3 p. 9, line 1—p. 11, line 10 p. 13, line 15—p. 16, last line.
Hubara I., et al., "Binarized Neural Networks", 30th Conference on Neural Information Processing Systems (NIPS 2016), Barcelona, Spain, 2016, pp. 1-9.
Agustsson E., et al., "Soft-to-Hard Vector Quantization for End-to-End Learned Compression of Images and Neural Networks", Apr. 3, 2017, 16 pages.
Chen W., et al., "Compressing Neural Networks with the Hashing Trick", Apr. 19, 2015, 10 pages.
Courbariaux M., et al., "Binarized Neural Networks: Training Neural Networks with Weights and Activations Constrained to +1 or −1", Mar. 17, 2016, 11 pages.
Gong Y., et al., "Compressing Deep Convolutional Networks Using Vector Quantization," Dec. 18, 2014 (Dec. 18, 2014), pp. 1-10, XP055262159, Retrieved from the Internet: URL:http://arxiv.org/pdf/1412.6115v1.pdf [retrieved on Apr. 1, 2016], p. 1-p. 9, paragraph 3.
Gupta S., et al., "Deep Learning with Limited Numerical Precision," Feb. 9, 2015, 10 pages.
Han S., et al., "Deep Compression: Compressing Deep Neural Networks with Pruning, Trained Quantization and Huffman Coding", Published as a Conference Paper at ICLR, Feb. 15, 2016, 14 Pages.
Hubara I., et al., "Quantized Neural Networks: Training Neural Networks with Low Precision Weights and Activations", Sep. 22, 2016, 29 pages.
Jacob B., et al., "Quantization and Training of Neural Networks for Efficient Integer-Arithmetic-Only Inference", Dec. 15, 2017, 14 pages.
Leng C., et al., "Extremely Low Bit Neural Network: Squeeze the Last Bit Out with ADMM", Sep. 13, 2017, 16 pages.
Li F., et al., "Ternary Weight Networks", Nov. 19, 2016, 5 pages.
Lin D.D., et al., "Fixed Point Quantization of Deep Convolutional Networks," Nov. 19, 2015 (Nov. 19, 2015), pp. 1-10, XP055284812, Retrieved from the Internet: URL:https://arxiv.org/pdf/1511.06393v3.pdf [retrieved on Jun. 30, 2016].
Mellempudi N., et al., "Ternary Neural Networks with Fine-Grained Quantization", May 30, 2017, 11 pages.
Rastegari M., et al., "XNOR-Net: ImageNet Classification Using Binary Convolutional Neural Networks", Aug. 2, 2016, 17 pages.
Vanhoucke V., et al., "Improving the Speed of Neural Networks on CPUs", 2011, 8 pages.
Zhou A., et al., "Incremental Network Quantization: Towards Lossless CNNs with Low-Precision Weights", Aug. 25, 2017, Conference paper at ICLR 2017, 14 pages.
Zhou S., et al., "DoReFa-Net: Training Low Bitwidth Convolutional Neural Networks with Low Bitwidth Gradients", Feb. 2, 2018, 13 pages.
Zhu C., et al., "Trained Ternary Quantization", Feb. 23, 2017, Conference Paper at ICLR 2017, 10 pages.

* cited by examiner

CONTINUOUS RELAXATION OF QUANTIZATION FOR DISCRETIZED DEEP NEURAL NETWORKS

CROSS-REFERENCE TO RELATED APPLICATION

This application claims priority to Greece Patent Application No. 20180100211, filed on May 17, 2018, and titled "CONTINUOUS RELAXATION OF QUANTIZATION FOR DISCRETIZED DEEP NEURAL NETWORKS," the disclosure of which is expressly incorporated by reference herein in its entirety.

BACKGROUND

Field

Certain aspects of the present disclosure generally relate to machine learning and, more particularly, to quantization of weights and activations for discretized deep neural networks.

Background

An artificial neural network, which may be composed of an interconnected group of artificial neurons (e.g., neuron models), is a computational device or represents a method performed by a computational device. These neural networks may be used for various applications and/or devices, such as internet protocol (IP) cameras, Internet of Things (IoT) devices, autonomous vehicles, and/or service robots.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep neural networks, are layered neural network architectures. In these layered neural network architectures, the output of a first layer of neurons becomes an input to a second layer of neurons, the output of a second layer of neurons becomes an input to a third layer of neurons, and so on. Deep neural networks may be used for various tasks, such as image recognition, object detection, and natural language processing. These tasks may be performed on mobile devices. Given the limited computational power of mobile devices, it is desirable to reduce the computational costs of deep neural networks.

SUMMARY

In one aspect of the present disclosure, a method for quantizing a neural network is disclosed. The method includes modeling noise of parameters of the neural network. The method also includes assigning grid values to each realization of the parameters according to a concrete distribution that depends on a local fixed-point quantization grid and the modeled noise. The method further includes computing a fixed-point value representing parameters of a hard fixed-point quantized neural network.

Another aspect of the present disclosure is directed to an apparatus including means for modeling noise of parameters of the neural network. The apparatus also includes means for assigning grid values to each realization of the parameters according to a concrete distribution that depends on a local fixed-point quantization grid and the modeled noise. The apparatus further includes means for computing a fixed-point value representing parameters of a hard fixed-point quantized neural network.

In another aspect of the present disclosure, a non-transitory computer-readable medium records program code. The program code is for quantizing a neural network. The program code is executed by a processor(s) and includes program code to model noise of parameters of the neural network. The program code also includes program code to assign grid values to each realization of the parameters according to a concrete distribution that depends on a local fixed-point quantization grid and the modeled noise. The program code further includes program code to compute a fixed-point value representing parameters of a hard fixed-point quantized neural network.

Another aspect of the present disclosure is directed to an apparatus for quantizing a neural network. The apparatus has a memory and one or more processors coupled to the memory. The processor(s) is configured to model noise of parameters of the neural network. The processor(s) is also configured to assign grid values to each realization of the parameters according to a concrete distribution that depends on a local fixed-point quantization grid and the modeled noise. The processor(s) is further configured to compute a fixed-point value representing parameters of a hard fixed-point quantized neural network.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
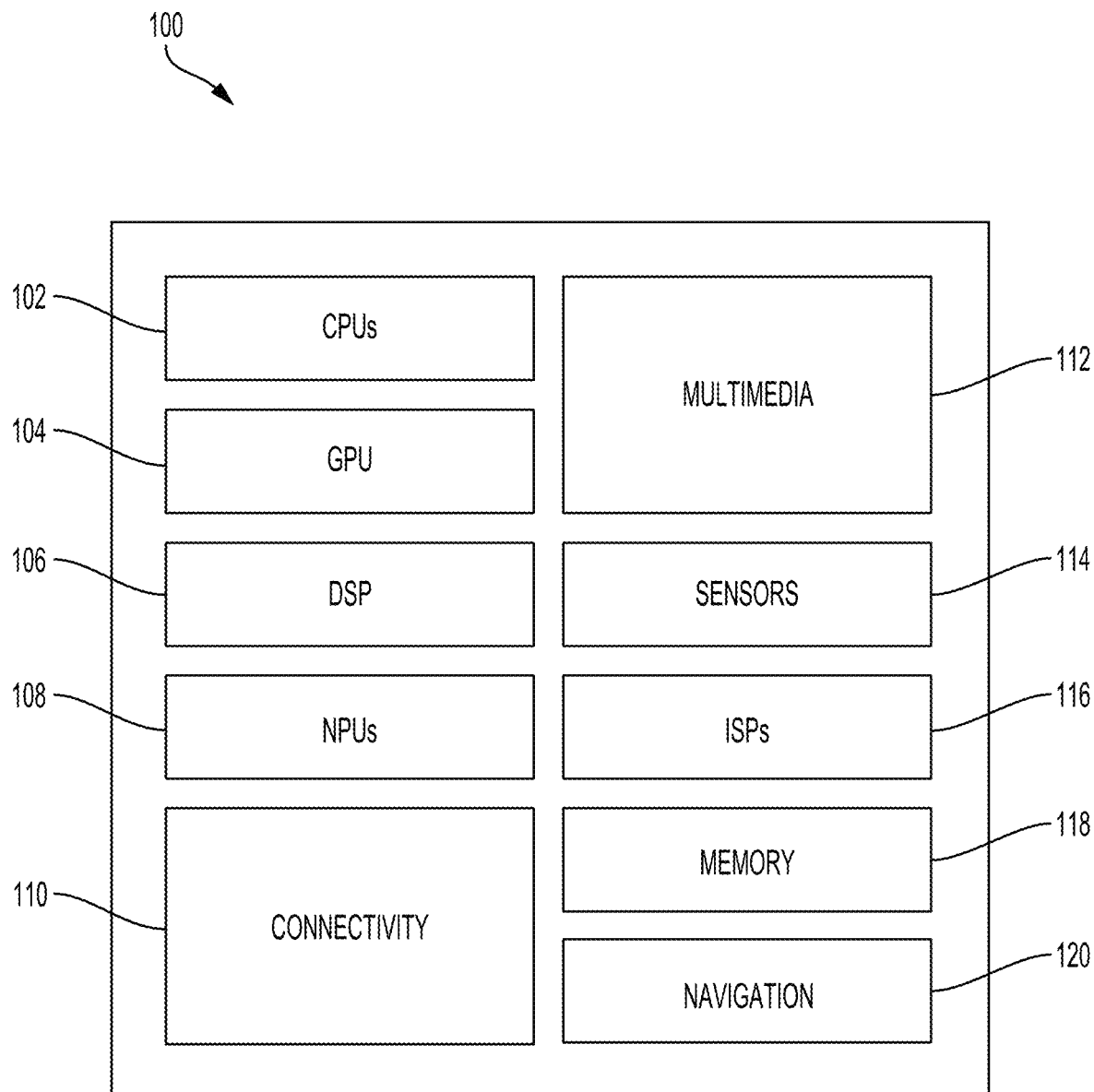
FIG. 1 illustrates an example implementation of designing a neural network using a system-on-a-chip (SOC), including a general-purpose processor, in accordance with certain aspects of the present disclosure.

FIG. 1 illustrates an example implementation of a system-on-a-chip (SOC) 100, which may include a central processing unit (CPU) 102 or a multi-core CPU configured to perform continuous relaxation of quantization in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to learn a fixed-point quantization grid for parameters of the neural network, the neural network using a first amount of computing resources. The instructions loaded into the CPU 102 may also comprise code to assign grid values from the fixed-point quantization grid to each realization of the parameters according to a concrete distribution that depends on modeled noise of the parameters and the fixed-point quantization grid. The instructions loaded into the CPU 102 may further comprise code to compute a fixed-point value representing the parameters to form a hard fixed-point quantizer for a discretized deep neural network using a second amount of computing resources that is less than the first amount of computing resources.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
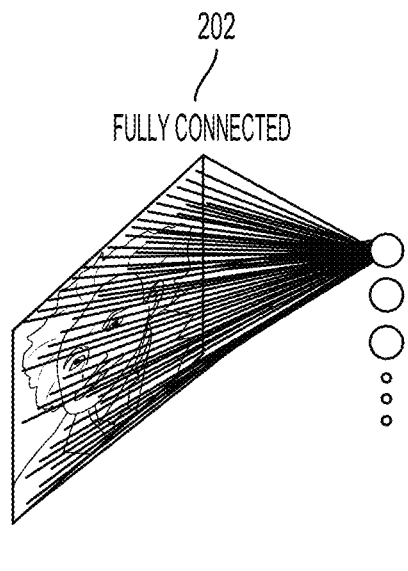
FIGS. 2A, 2B, and 2C are diagrams illustrating a neural network in accordance with aspects of the present disclosure.
Figure 2B:
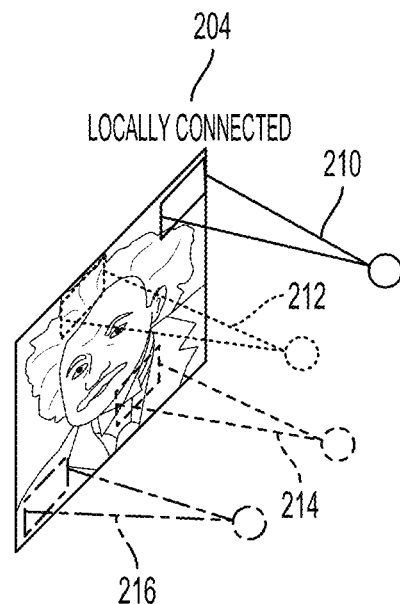

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
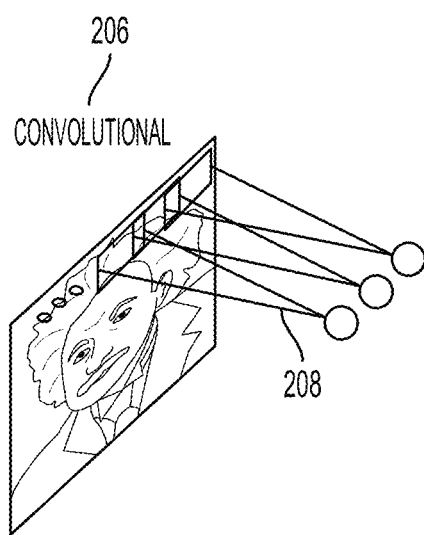

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
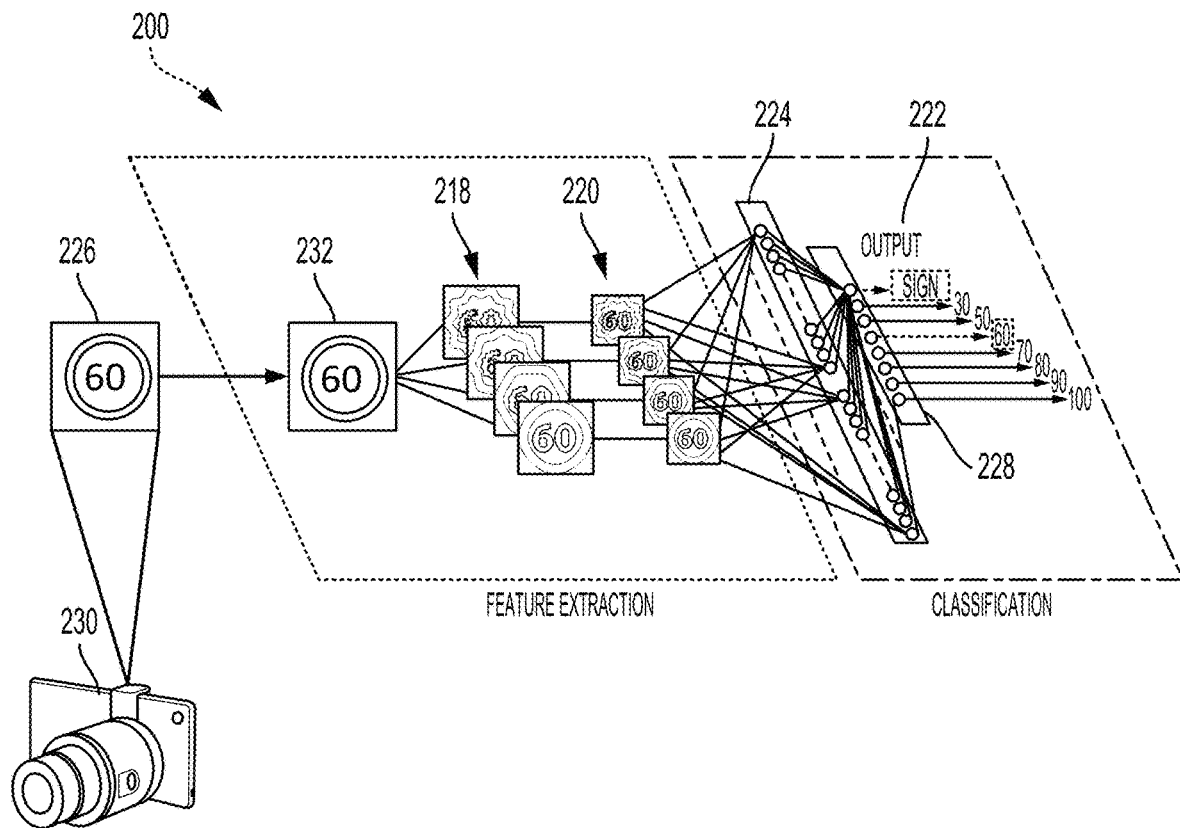
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
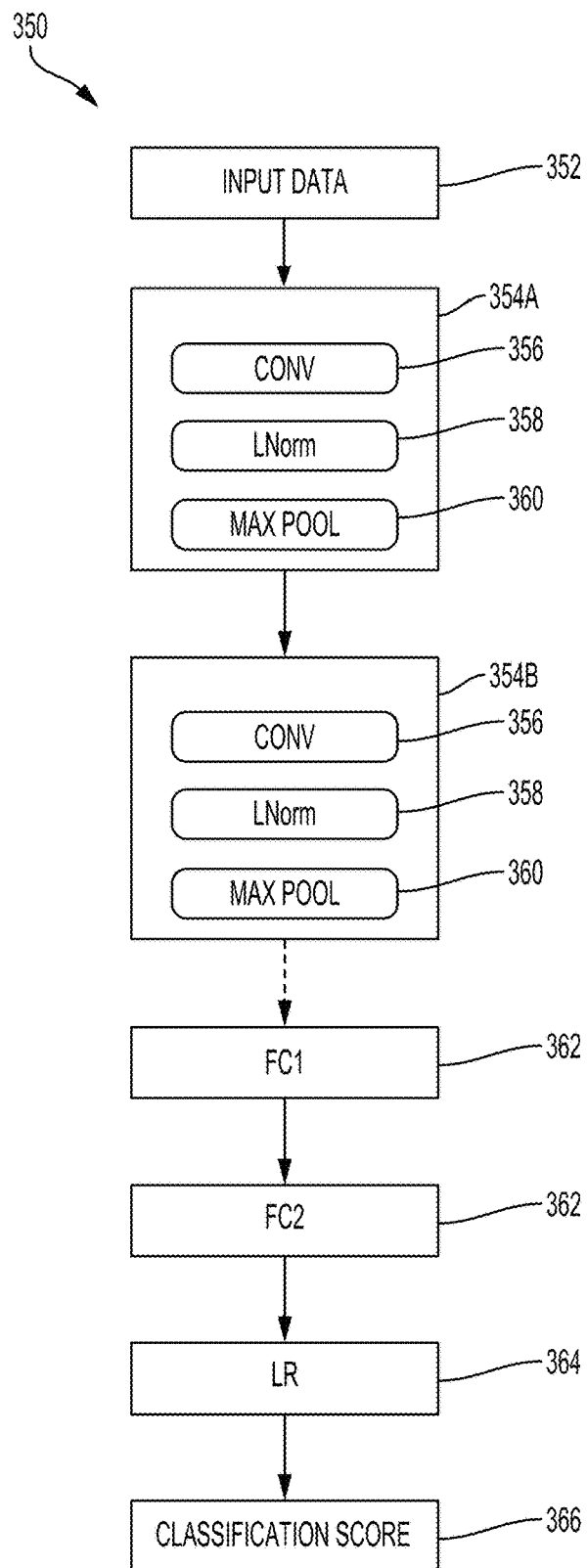
FIG. 3 is a block diagram illustrating an exemplary deep convolutional network (DCN) in accordance with aspects of the present disclosure.

FIG. 3 is a block diagram illustrating an deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
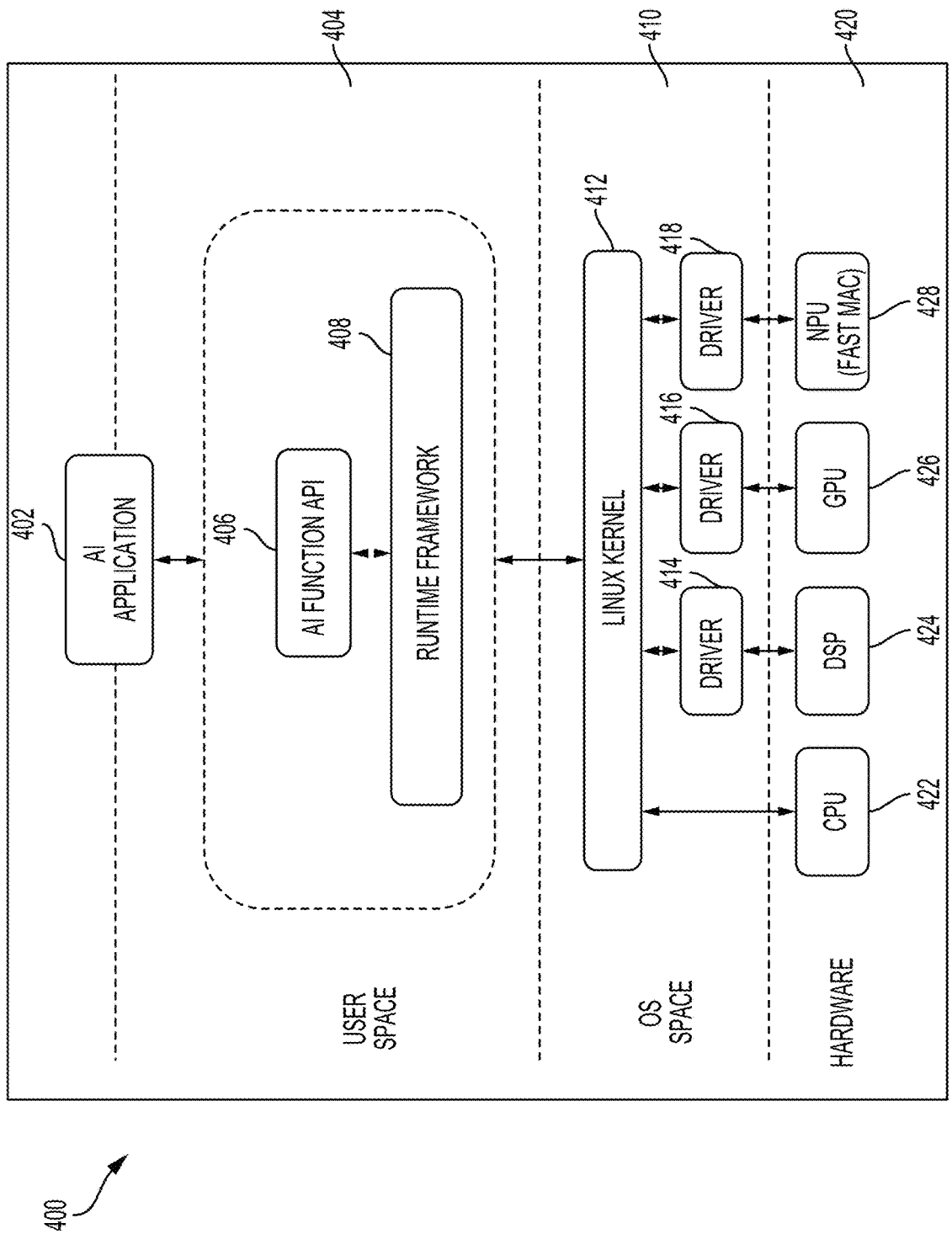
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support a continuous relaxation of quantization during run-time operation of an AI application 402, according to aspects of the present disclosure.

The AI application 402 may be configured to call functions defined in a user space 404 that may, for example, provide for the detection and recognition of a scene indicative of the location in which the device currently operates.

The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428, if present.

In one aspect, the learning means, the assigning means, and/or the computing means may be the CPU 102, program memory associated with the CPU 102, the dedicated memory block 118, local processing units 202, and or the routing connection processing unit 216 configured to perform the functions recited. In another configuration, the aforementioned means may be any module or any apparatus configured to perform the functions recited by the aforementioned means.

According to certain aspects of the present disclosure, each of the local processing units 202 may be configured to determine parameters of the model based upon desired one or more functional features of the model, and develop the one or more functional features towards the desired functional features as the determined parameters are further adapted, tuned and updated. A novel quantization procedure that allows for learning fixed-point grids and facilitates gradient-based optimization of the weights and activations of quantized neural networks is described as follows. As described herein, the terms discretization and quantization are used interchangeably.

Neural networks have excelled in a variety of large scale problems due to their flexible parametric nature. In conventional neural networks, the activations and weights may be represented using a floating point format, such as a 32-bit floating point format. Conventional neural networks may be implemented on large computing platforms with high processing and storage capabilities. The neural networks implemented on large computing platforms may be trained with high precision numbers, such as numbers in a 32-bit floating point format. Training the neural network with high precision numbers improves the neural network's accuracy.

A neural network may also be implemented on devices, such as a mobile phone, with limited storage and processing capabilities. Deploying a large model for a neural network on a resource-constrained device, such as a mobile phone, drone, or an IoT device, is challenging. For example, the amount of power, memory, and computation resources used by a large model often exceeds an amount of power, memory, and/or computation resources available on the resource-constrained device. That is, devices with limited storage and processing capability might not be practical for, or capable of, performing calculations using a 32-bit floating point format.

Thus, other, simpler, formats of neural networks may be a better choice for a device with limited storage and processing capabilities. Research into neural network compression has increased as compression may reduce the use of power, memory, and/or computation resources. Neural network compression techniques may be divided into two categories: pruning and quantization. The pruning and quantization neural network compression techniques are not mutually exclusive. Pruning is directed to reducing a size of a model by altering the network architecture. Quantization is directed to reducing the precision of the arithmetic operations in the network.

Conventional neural network quantization methods either simulate or enforce discretization of the network during training, e.g. via rounding of the weights and activations. Although seemingly straightforward, the discontinuity of the discretization makes the gradient-based optimization infeasible. The reason is that there is no gradient of the loss with respect to the parameters (e.g., weights and activations) of the neural network. Conventional quantization solutions do not consider the changes in a neural network's loss function when performing quantization, nor do they consider the neural network's accuracy. The neural network's loss function is used to minimize a loss during training.

In mathematics, discretization is the process of transferring continuous functions, models, variables, and equations into discrete counterparts (e.g., sampling). The discrete counterparts may then be used for numerical evaluation and implementation on digital computers. To discretize the weights and activations of a neural network, a quantizer q(·) discretizes a continuous signal to a countable set of discrete values. This process is inherently lossy and non-invertible. Specifically, the exact value of the input cannot be determined from the output of the quantizer. Conventional quantizers may use a rounding function, which given an input signal x, produces an output based on the following equation:

$$q(x) = \alpha \left\lfloor \frac{x}{\alpha} + \frac{1}{2} \right\rfloor, \qquad (1)$$

where α corresponds to the step size of the quantizer. The floor function rounds the input signal x to the closest integer number that is less than or equal to x. For example, 0.1234 is rounded to 0. −4.67 is rounded to −5 etc. The brackets indicate the application of the floor function to whatever lies in between the floor brackets. With α=1, the function maps the input signal x to its nearest integer.

While a rounding function, such as the rounding function of equation 1, may reduce a size of a neural network, the rounding function may also reduce the neural network's performance. For example, the lossy nature of quantization may introduce rounding errors that may be compounded through the neural network, thereby corrupting information.

To this end, it is desirable to train a neural network while simulating the effects of quantization during the training procedure. This will encourage the weights and activations to be robust to quantization, thereby decreasing a gap in performance between the full-precision and discretized deep neural network. Aspects of the present disclosure describe a smooth quantizer to enable gradient-based updating.

The smooth quantizer may reduce a size and a computational complexity of a neural network. Additionally, by enabling gradient-based updating, the smooth quantizer may improve the discretized deep neural network's accuracy in comparison to an accuracy of conventionally quantized neural networks. In one configuration, a quantization technique converts a floating point 32-bit neural network to support low-bit-width inference.

Conventional solutions bias gradients of their training objective, resulting in a performance loss. According to aspects of the present disclosure, a process for learning a quantization grid is affected by the final classification performance. To train a neural network that can be discretized with minimal loss of performance, aspects of the present disclosure are directed to a differentiable quantization procedure. Differentiability may be achieved by transforming continuous distributions over the weights and activations of the neural network to categorical distributions over the quantization grid.

Furthermore, in contrast to conventional solutions that are limited to a single type of quantization grid, a definition of the quantization grid is flexible. As a result, the learning process is applicable to different types of quantization grids. For example, both fixed and floating point grids may be learned. As another example, non-uniform grids may be learned, if desired. Variances of the variables being quantized may also be modeled. The variances may be tailored towards a specific grid. For example, for floating point grids, multiplicative noise may be more desirable than additive noise. By choosing proper noise distributions, the performance of the quantization method may be improved.

Aspects of the present disclosure are directed to a novel quantization procedure that may bypass the non-differentiability of the quantization operation during training. In one configuration, a quantization procedure is used for learning fixed-point grids and performing gradient-based updates for the weights and activations of a quantized neural network. In particular, the quantizer converts a floating point format, such as the 32-bit floating point format, to a low-bit-width format. That is, the values of the weights and activations of a neural network may be converted to a low-bit-width format, such as an integer between zero and two hundred fifty-five. Furthermore, a neural network may be trained to improve the conversion of the weights and activations to the low-bit-width format.

A vocabulary is an element of a quantizer. The vocabulary is a set of countable output values that may be generated by the quantizer. In one configuration, for quantizing a neural network to lower than full precision numbers (e.g., from 32-bit floating point format to a low-bit-width format), the vocabulary is a grid $\mathcal{G}$ of ordered values. For fixed-point quantization, the grid $\mathcal{G}$ corresponds to a set of integers with a size of $K=2^b$, b being the number of bits used by a memory and/or a processor corresponding to a discretized deep neural network (DDNN). The memory and processor may be defined in a limited resource device, such as mobile phone, to execute the DNN. In one example, the number of bits b may be eight if two hundred fifty-six values are used. The input signal x to the quantizer is a weight or an activation of a DNN. The grid $\mathcal{G}$ is defined as:

$$\mathcal{G} = [-2^{b-1}, \ldots, 0, \ldots, 2^{b-1}-1]. \qquad (2)$$

The grid $\mathcal{G}$ may be represented as a vector of integers. By construction, the grid $\mathcal{G}$ is agnostic to the input to the quantizer. That is, the grid $\mathcal{G}$ may not adapt to a minimum and maximum value of the input to the quantizer. To encapsulate all of the values used for the weights and/or activations, two free parameters, a scale α, and an offset β are used to yield an adaptable quantization grid $\hat{\mathcal{G}}$. The adaptable quantization grid $\mathcal{G}$ may adapt to a range and location of the input signal x. As an example, the input signal x may have values of [1,5]. In this example, the observations of the input signal x may be, for example {1.432; 4.54; 3.244}. As such, the grid should cover the same range as the input signal x. The range is characterized by the smallest and largest value. Additionally, the range may be characterized by its center 3 (e.g., the center of [1, 2, 3, 4, 5]) and by the distance of the min and max value to the center.

For example, if a weight matrix is input to the quantizer, the observations are the values of the weight matrix that are output by the quantizer. The weight matrix is based on weights observed at a layer. The observations may also be based on an activation matrix generated from activations observed at a layer. In one configuration, the quantizer for weights is different from the quantizer for activations. The adaptable quantization grid $\hat{\mathcal{G}}$ may scale to the values of the weights and/or activations. The adaptable quantization grid $\hat{\mathcal{G}}$ is determined as follows:

$$\hat{\mathcal{G}} = \alpha \mathcal{G} + \beta, \qquad (3)$$

where the offset β is initialized to a predetermined value, such as β=max_val−(0.5*(max_val−min_val)). Where max_val and min_val are the maximum and minimum values of the input, respectively. After initialization, along with the other parameters, the offset may be updated with stochastic gradient descent. An adaptable quantization grid $\hat{\mathcal{G}}$ for weights is different from an adaptable quantization grid $\hat{\mathcal{G}}$ for activations.

Figure 5:
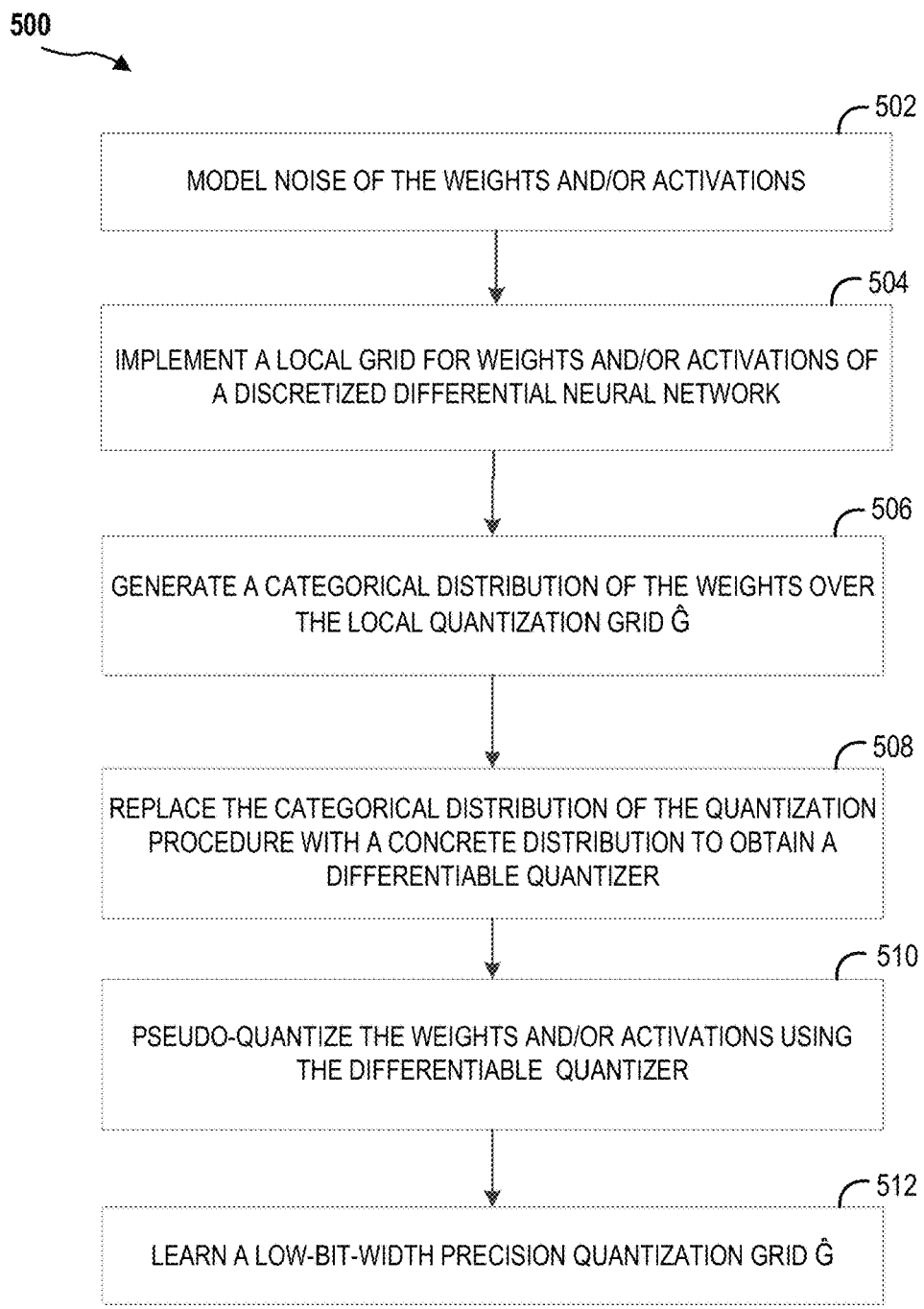
FIG. 5 is an exemplary flow diagram illustrating a method of quantizing for a discretized deep neural network using a continuous relaxation of quantization, in accordance with aspects of the present disclosure.

FIG. 5 is an exemplary flow diagram illustrating a method 500 for training to quantize a discretized deep neural network (DDNN), in accordance with aspects of the present disclosure. Referring again to FIG. 5, at block 502, a noise of the weights and/or the activations is modeled. That is, the input signal x may have some noise. The noise $\epsilon$ determines the probability for a specific value of the input signal x to move to each grid point of the quantization grid $\hat{\mathcal{G}}$. In one configuration, a is the standard deviation of the noise $\epsilon$, where $\sigma$ is initialized to a pre-determined value. For example, the standard deviation $\sigma$ is initialized to be three times smaller than a scale of the quantization grid $\hat{\mathcal{G}}$. After initialization, the standard deviation $\sigma$ may be updated with stochastic gradient descent.

The noise $\epsilon$ may smooth the quantization procedure and hence allow for gradient-based updates of the quantized weights and/or activations. In aspects of the present disclosure, the noise $\epsilon$ is modeled as acting additively to the input signal x and governed by a distribution $p(\epsilon)$. This process induces a distribution over the input signal $p(\tilde{x})$, where a noisy input signal $\tilde{x}$ is defined by $x+\epsilon$ (e.g., a sum of the input signal x and noise $\epsilon$), where $\epsilon$ is drawn from the distribution $p(\epsilon)$. In this example, it is assumed that the noise is distributed according to a zero mean logistic distribution L with a standard deviation $\sigma$ (e.g., $L(0,\sigma)$, hence leading to an input distribution of $p(\tilde{x})=L(x,\sigma)$, where the mean is the actual weight or activation (x).

The quantization procedure next implements a local grid for the weights and activations of the DDNN, as shown in block 504. Implementing the local grid may also be referred to as learning the local grid. For example, the local grid is used for the weights and/or the activations when a bit (b) width is larger than two (see equation 1) to discretize a deep neural network when configured for runtime neural network inference.

According to aspects of the present disclosure, sampling of the quantized value $\hat{x}$ is independent of the grid size of the quantization grid $\hat{\mathcal{G}}$ by assuming a zero probability for sampling grid points $g_i$ that lie far away from the input signal x. The noise distribution $p(\tilde{x})$ may be truncated such that it falls within a localized grid around the input signal x. The noise distribution $p(\tilde{x})$ may be truncated by considering grid points $g_i$ that are within a number ($\delta$) of standard deviations away from the input signal x. To simplify the computation performed for determining the local grid elements, the grid element that is closest to the input signal x is chosen as the center of the localized grid, according to equation 4. Equation 4 is a modification of the CDF to provide a truncated distribution (e.g., a distribution from $x-\delta\sigma$ to $x+\delta\sigma$]):

$$P(\tilde{x} \le c \mid \tilde{x} \in ([x] - \delta\sigma, [x] + \delta\sigma]) = \frac{P(\tilde{x} \le c) - P(\tilde{x} < [x] - \delta\sigma)}{P(\tilde{x} \le [x] + \delta\sigma) - P(\tilde{x} < [x] - \delta\sigma)}. \quad (4)$$

In this aspect of the present disclosure, the smoothed quantized value based on a local grid can be obtained according to equation 5, where $g_i$ corresponds to the range $x-\delta\sigma$ to $x+\delta\sigma$]:

$$\hat{x} = \sum_{g_i \in (x-\delta\sigma, x+\delta\sigma]} z_i g_i. \quad (5)$$

In block 506, a categorical distribution of the input signal x is generated over the local quantization grid $\hat{\mathcal{G}}$. This process may include assigning a grid value for each realization of the input signal x. Due to the stochastic nature of the noisy input signal $\tilde{x}$, a deterministic rounding function results in a stochastic quantizer for the input signal x. In one configuration, the input signal x is quantized by discretizing the distribution $p(\tilde{x})$ onto the quantization grid $\hat{\mathcal{G}}$. Grid points $g_i$ may then be sampled from the quantization grid $\hat{\mathcal{G}}$. Specifically, the categorical distribution over the quantization grid $\hat{\mathcal{G}}$ is constructed by adopting intervals of width equal to the scale $\alpha$ centered at each of the grid points. That is, an interval is determined for each grid point $g_i$. The probability of selecting a particular grid point $g_i$ may be equal to the probability of a value of the noisy input signal $\tilde{x}$ being within an interval of the grid point $g_i$:

$$p(\hat{x} = g_i \mid x, \sigma) = P(\tilde{x} \le (g_i + a/2)) - P(\hat{x} < (g_i - a/2)) \quad (6)$$

$$= \text{Sigmoid}((g_i + a/2 - x)/\sigma) - \text{Sigmoid}((g_i - a/2 - \tilde{x})/\sigma), \quad (7)$$

where $\hat{x}$ corresponds to a quantized variable and $P(\cdot)$ corresponds to a cumulative distribution function (CDF), and Sigmoid $$(x) = \frac{1}{1 + \exp(-x)}.$$

According to aspects of the present disclosure, x is an input to the quantizer, $\tilde{x}$ is the input with noise $\epsilon$, and $\hat{x}$ is the quantized input. The quantized input $\hat{x}$ is selected from the quantization grid $\hat{\mathcal{G}}$. Furthermore, the last step (equation 5) is due to the logistic noise assumption. The CDF determines the probability of obtaining the quantized input $\hat{x}$ given an input x.

For example, in the last step, for a grid point $g_i$, where i represents a given point on the quantization grid $\hat{\mathcal{G}}$, the grid point $g_i$ is added with half of the scale ($\alpha/2$) and subtracted with half of the scale ($\alpha/2$) to generate a range. The maximum value of the range of a grid point $g_i$ is ($g_i+\alpha/2$) and the minimum value of the range of a grid point $g_i$($g_i-\alpha/2$). The range of a grid point $g_i$ may be referred to as a bucket. Given the range, the quantizer predicts the probability $P(\cdot)$ of a value of the noisy input signal $\tilde{x}$ being within the range. Equation 7 determines the probability mass within each bucket (e.g., a height of the bucket under the distribution). The probability mass correlates with the probability of an input falling within a bucket. That is, the larger the probability mass, the greater the chance for an input x to fall within the bucket.

In this example, it is assumed that the first and last grid points reside within ($g_0-\alpha/2$, $g_0+\alpha/2$] and ($g_K-\alpha/2$, $g_K+\alpha/2$], respectively. Under this assumption, the noise distribution over the input signal $p(\tilde{x})$ is truncated, such that it only has support within ($g_0-\alpha/2$, $g_K+\alpha/2$]. This truncation may be provided by a modification of the cumulative distribution function, according to equation 7:

$$P(\tilde{x} \leq c \mid \tilde{x} \in (g_0 - a/2, g_K + a/2]) = \quad (8)$$
$$\frac{P(\tilde{x} \leq c) - P(\tilde{x} < g_0 - a/2)}{P(\tilde{x} \leq g_K + a/2) - P(\tilde{x} < g_0 - a/2)}.$$

In equation 8, c is an arbitrary real number that is within the interval noted in equation 8. For training, the quantizer assigns a specific grid value to the input signal x by drawing a random sample, as described in further detail below (see equations 9 and 10). Drawing the random sample may be similar to sampling the original distribution $p(\tilde{x})$ and then rounding the sample to the nearest grid point. That is, drawing the random sample emulates quantization noise, which prevents the DNN from fitting the data. The noise may be reduced by encouraging the weights and activations to cluster around points on the quantization grid $\hat{\mathcal{G}}$. The performance loss may be reduced by clustering weights and activations around points on the grid. During testing, rather than drawing a random sample, the grid point with the highest categorical probability is deterministically selected.

During training, at block 508, the quantization procedure is converted to a differentiable quantization procedure by replacing the categorical distribution with a concrete distribution. The conversion corresponds to a continuous relaxation of the categorical distribution and may be referred to as a noisy softmax. The noisy softmax refers to a softmax function with noise $g_k$ added to the input to the softmax. The variable $g_k$ represents a random sample selected from a distribution. Specifically, using the Gumbel function, u~uniform distribution (0,1), where $g_k = -\log(-\log(u))$. In one configuration, $\pi_k$ is the categorical probability of a sampling grid point k (e.g., $\pi_i = p(\hat{x} = g_i$. A random sample $z_k$ from the concrete distribution is defined as:

$$g_k \sim Gumbel(0, 1), z_k = \frac{\exp((\log \pi_k + g_k)/\lambda)}{\sum_i \exp((\log \pi_{ki} + g_i)/\lambda)}, \quad (9)$$

where $\lambda$ is a temperature parameter that controls the degree of approximation, because as $\lambda \to 0$, the concrete distribution becomes a categorical distribution. z is a vector that is output by a softmax layer and k is a sample from the vector z. The smoothed quantized value can subsequently be obtained as follows:

$$\hat{x} = \sum_{i=1}^{K} z_i \hat{\mathcal{G}}_i. \quad (10)$$

This aspect of the present disclosure defines a fully differentiable soft quantization procedure that allows for stochastic gradients for both the quantizer scale $\alpha$, offset $\beta$, and standard deviation $\sigma$ parameters as well as the input signal x. When there is no noise at the input x, then the categorical distribution would have non-zero mass at a single value, thus prohibiting gradient-based optimization for the input signal x and the standard deviation parameter $\sigma$. At block 510, the weights and/or activation are pseudo-quantized using the differentiable quantizer. Finally, at block 512 of FIG. 5, a low-bit-width precision quantization grid $\hat{\mathcal{G}}$ is learned according to equation 3.

During testing, a DDNN may perform model a noise of the weights and/or the activations (block 502). Additionally, the DDN may generate a categorical distribution of the input signal x over the quantization grid $\hat{\mathcal{G}}$ (block 506). At test time, the weights and/or activations are quantized by reverting to a categorical distribution (instead of the continuous surrogate) or by selecting the most probable value of the grid, at block 530, during testing. The most probable value of the quantization grid $\hat{\mathcal{G}}$ is obtained by rounding to the nearest grid point.

In operation, sampling the smoothed quantized value $\hat{x}$ based on drawing K samples from the concrete distribution, as described in equation 8, may be expensive for larger values of K. Drawing K concrete samples for individual weights and activations in a neural network increases the number of operations performed for evaluating the network. Additionally, drawing K concrete samples results in an increased amount of values stored in memory for the gradient computation during a backward pass. Therefore, drawing K concrete samples may be undesirable due to the increased use of resources, such as memory.

Aspects of the present disclosure are directed to training a neural network while simulating the effects of quantization during the training procedure. As discussed, the training encourages the weights and activations to be robust to quantization, thereby, decreasing a gap in performance between the full-precision and discretized deep neural network.

Figure 6A:
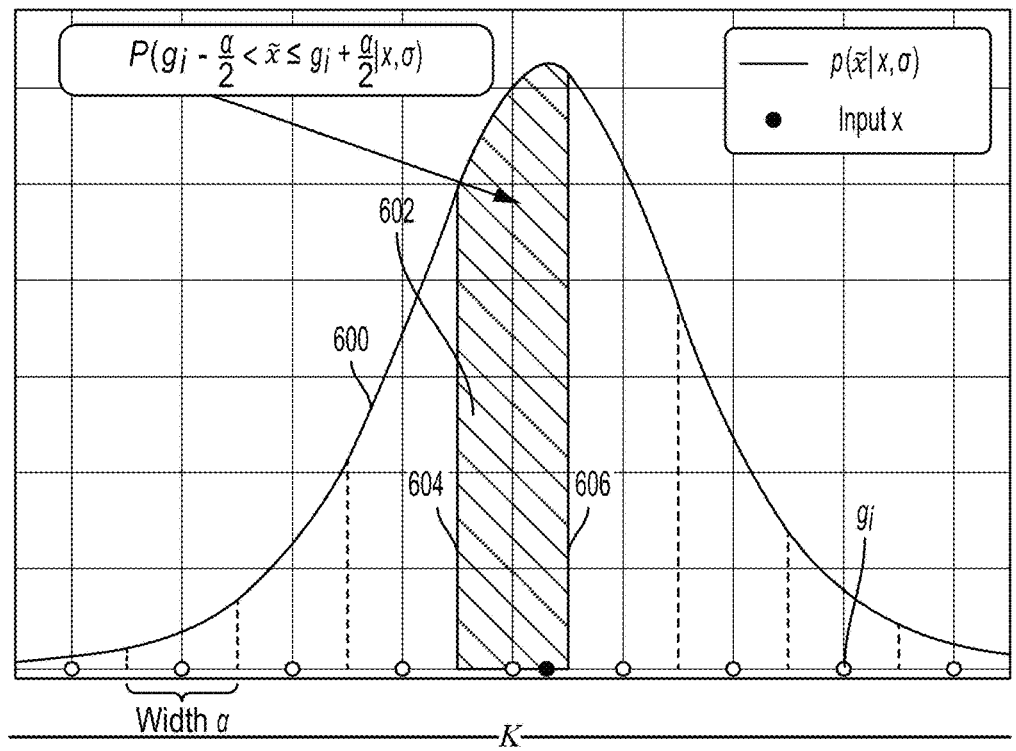
FIGS. 6A and 6B illustrate an example of a discretization process, according to aspects of the present disclosure.
Figure 6B:
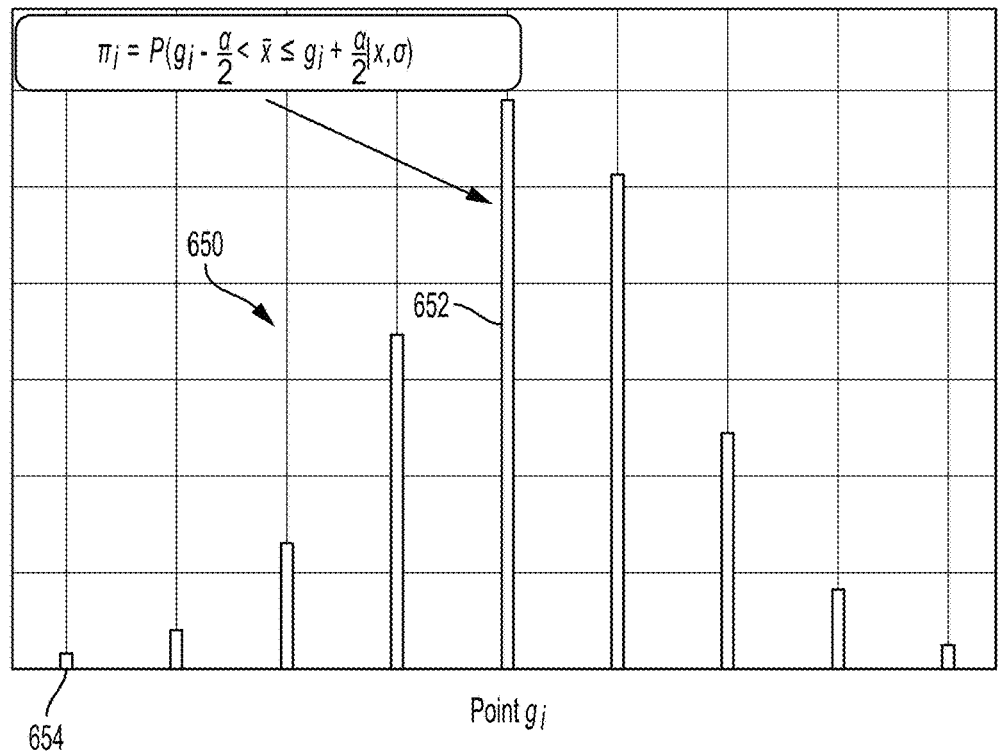

FIG. 6A illustrates an example of the discretization process according to aspects of the present disclosure. As shown in FIG. 6A, given a distribution $p(\tilde{x})$ 600 over a real line, the distribution is partitioned into K intervals of width a, and a center of each interval is a grid point $g_i$. For example, an interval 602 is defined between a minimum value 604 and a maximum value 606. The interval 602 may also be referred to as a bucket. The real line refers to a range of all possible numbers. As shown in FIG. 6B, given an input signal x, the quantizer determines the probability of the input x falling within an interval (e.g., width a) of a grid point $g_i$.

FIG. 6B illustrates an example of a categorical distribution 650 over a grid obtained after discretization. As shown in FIG. 6B, a probability of each of the grid points $g_i$ is equal to a probability of $\tilde{x}$ falling inside an interval of a grid point $g_i$. For example, a first grid point $g_i$ 652 has the greatest probability and a second grid point $g_i$ 654 has the least probability.

Figure 7:
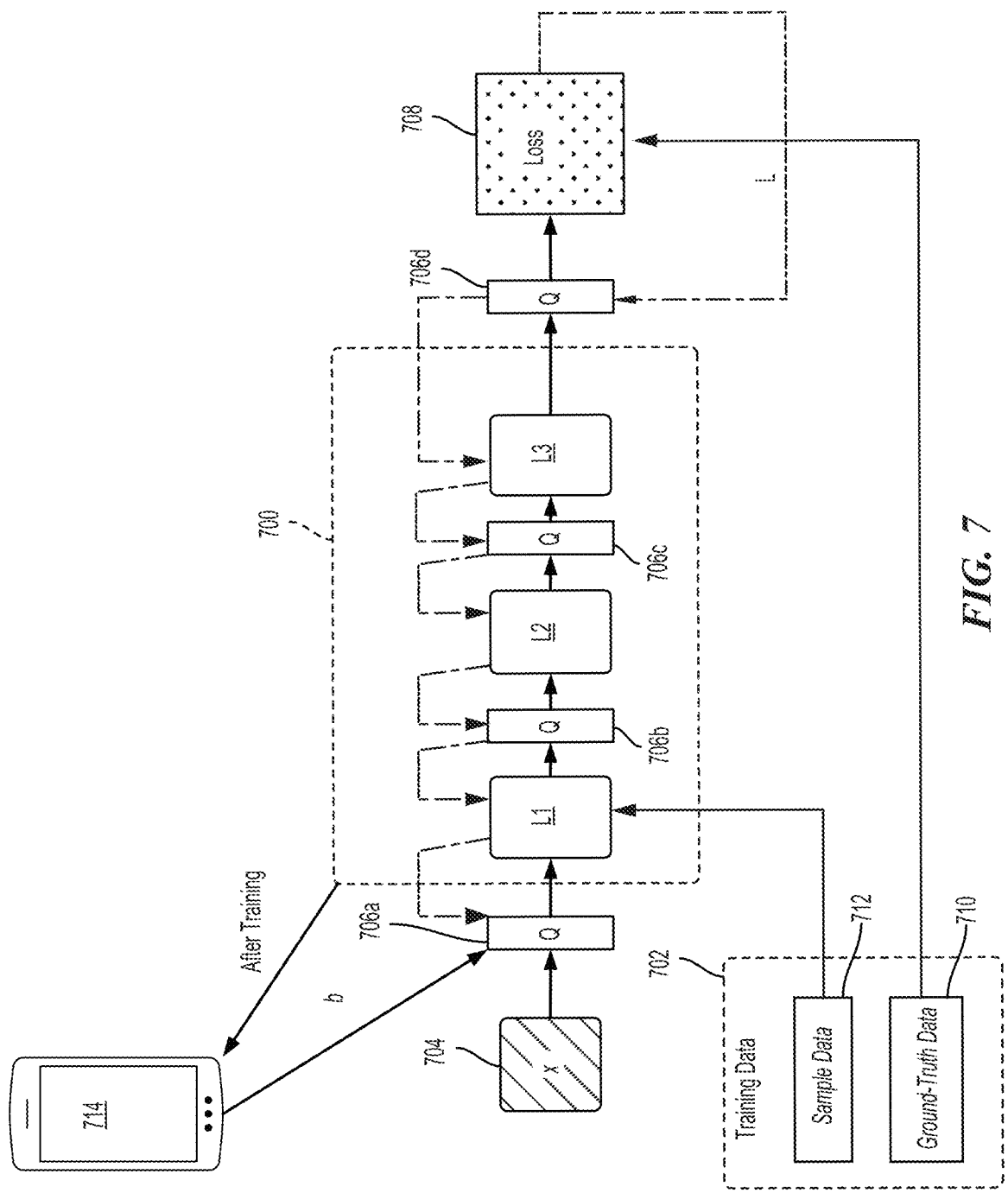
FIG. 7 illustrates a system flow diagram for training a discretized deep neural network, according to aspects of the present disclosure.

FIG. 7 illustrates a flow diagram for training a neural network 700 according to aspects of the present disclosure. In one configuration, training data 702 may be stored at a data source, such as a server. The training data 702 includes sample data 712 and ground-truth data 710. During training, sample data 712 is input to the neural 700 for processing (e.g., classification).

The neural network 700 may be initialized with a set of input values x 704. As previously discussed, the input values x 704 include weights. The input values x 704 may also be referred to as an input signal x. In one configuration, prior to initializing the neural network 700 with the input values x, the input values x are quantized by a first quantizer 706a. A quantizer 706a, 706b, 706c, 706d may be defined before and after each layer L1, L2, L3. For example, the input data x quantized by the first quantizer 706a may be used by the first layer L1. Furthermore, the output (e.g., weights and activations) of the first layer L1 may be input to the second quantizer 706b. The quantizers 706a, 706b, 706c, 706d quantize each of the weights and/or activations independently. That is, the quantizers 706a, 706b, 706c, 706d quantize each weight of a set of weights and each activation of a set of activations independently. Some learnable parameters such as the noise, location, and scale of the grid may be shared across the weights and activations that belong to a specific layer L1, L2, L3.

According to aspects of the present disclosure, a grid corresponds to a set of integers with a size of $K=2^b$, b being the number of bits used by a memory and/or a processor that will execute the neural network 700. For example, the number of bits b may be obtained from a mobile device 714 that will execute the neural network 700. After training, the neural network 700 may be referred to as a discretized deep neural network 700. The discretized deep neural network 700 may be stored at the mobile device 714 to classify data at the mobile device 714.

During training, the neural network 700 receives sample data 712 and processes the sample data 712 through the multiple layers L1, L2, L3. The output may be parameters of an annotated element, such as a 3D bounding box or a parametric representation. Additionally, or alternatively, the output may be a classification score (e.g., inference score) for the sample data 712. The output of the neural network 700 is received at a loss module 708.

The loss module 708 implements a loss function that compares the neural network 700 to the ground-truth data 710. The error L is the difference (e.g., loss) between the output of the neural network 700 and the ground-truth data 710. The error L is output from the loss module 708 to the neural network 700. Specifically, the error L is received at the final quantizer 706d and backpropagated through the neural network 700 to update the parameters. The training may be performed during an offline phase of the neural network 700.

When the training is complete, the discretized deep neural network 700 may be stored at the mobile device 714. Based on the training, the discretized deep neural network 700 may quantize input values x during a testing phase (e.g., real world deployment). An amount of resources used by the input values x quantized during the testing phase is less than an amount of resources used by non-quantized input values x. Furthermore, based on the training, performance loss for the discretized deep neural network 700 is reduced.

Figure 8:
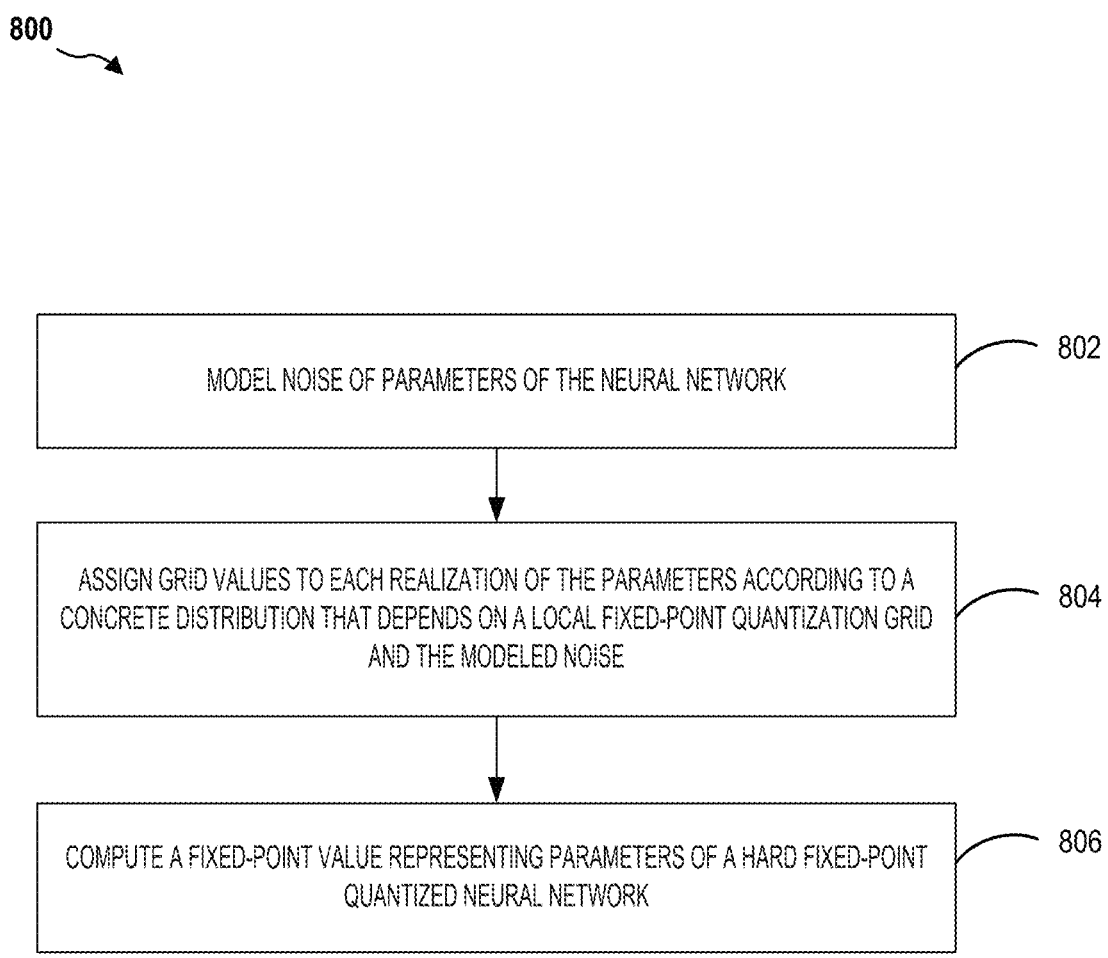
FIG. 8 illustrates a method for quantizing for a neural network, according to aspects of the present disclosure.

FIG. 8 illustrates a method 800 for quantizing for a discretized deep neural network using continuous relaxation of quantization, according to aspects of the present disclosure. In block 802, noise of parameters of the neural network are modeled. In block 804, grid values from a local fixed-point quantization grid are assigned to each realization of the parameters according to a concrete distribution that depends on the modeled noise and the local fixed-point quantization grid.

A differentiable soft fixed-point quantizer may be obtained based on the assignment of the grid values from the local fixed-point quantization grid. Next, the parameters are assigned to grid points of the fixed-point quantization grid according to predetermined grid point intervals. The assignment may also be performed by drawing random samples to assign the grid values to the parameters of the input signal x.

The fixed-point quantization may represent a quantization of 32-bit float format weights and activation to a low-bit-width precision (e.g., 8-bit) for implementing, for example, a hardware-based neural network inference application.

At block 806, a fixed-point value representing the parameters is computed to form a hard fixed-point quantized neural network. In one configuration, the hard fixed-point quantized neural network is a discretized deep neural network. In this configuration, the hard fixed-point quantized discretized deep neural network is configured for low-bit-width precision inference prediction. The hard fixed-point quantized discretized deep neural network uses less resources in comparison to a neural network (e.g., discretized deep neural network) that is not quantized.

In some aspects, the method 500 and the method 800 may be performed by the SOC 100 (FIG. 1). That is, each of the elements of the method 500 and the method 800 may, for example, but without limitation, be performed by the SOC 100 or one or more processors (e.g., CPU 102) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein a. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for quantizing a neural network, the method comprising:
   modeling noise of each parameter of a set of parameters of the neural network, the noise of each parameter indicating a probability of a value of the parameter being assigned to one grid value of a plurality of grid values in a local fixed-point quantization grid, the local fixed-point quantization grid corresponding to a scaled and offset grid of ordered values, a number of values in the grid of ordered values being based on an amount of bits used by one or both of a memory or a processor configured to execute the neural network;
   assigning a grid value to a realization of each parameter of the set of parameters according to a concrete distribution that depends on the local fixed-point quantization grid and the noise modeled for the respective parameter; and
   computing a fixed-point value representing each parameter of the set of parameters of a hard fixed-point quantized neural network.

2. The method of claim 1, further comprising learning the local fixed-point quantization grid during training.

3. The method of claim 1, in which the noise of each parameter acts additively to the respective parameter of the set of parameters of the neural network.

4. The method of claim 1, in which assigning the grid value to each parameter comprises creating a categorical distribution of the set of parameters over the local fixed-point quantization grid.

5. The method of claim 4, in which assigning the grid value to each parameter comprises selecting a maximum probability category from the categorical distribution to assign the grid value to each parameter.

6. The method of claim 4, further comprising:
   replacing the categorical distribution of the set of parameters over the local fixed-point quantization grid with the concrete distribution to obtain a differentiable soft quantizer; and
   pseudo-quantizing the set of parameters using the differentiable soft quantizer during training.

7. The method of claim 1, in which computing the fixed-point value comprises selecting a most probable grid point from a categorical distribution of the parameters to form the hard fixed-point quantized neural network.

8. The method of claim 1, in which computing the fixed-point value comprises selecting a most probable grid point by rounding to a nearest grid point.

9. The method of claim 1, in which the set of parameters comprise at least one of weights, activations, or a combination thereof.

10. An apparatus for quantizing a neural network, the apparatus comprising:
    means for modeling noise of each parameter of a set of parameters of the neural network, the noise of each parameter indicating a probability of a value of the parameter being assigned to one grid value of a plurality of grid values in a local fixed-point quantization grid, the local fixed-point quantization grid corresponding to a scaled and offset grid of ordered values, a number of values in the grid of ordered values being based on an amount of bits used by one or both of a memory or a processor configured to execute the neural network;
    means for assigning a grid value to a realization of each parameter of the set of parameters according to a concrete distribution that depends on the local fixed-point quantization grid and the noise modeled for the respective parameter; and
    means for computing a fixed-point value representing each parameter of the set of parameters of a hard fixed-point quantized neural network.

11. The apparatus of claim 10, further comprising means for learning the local fixed-point quantization grid during training.

12. The apparatus of claim 10, in which the noise of each parameter acts additively to the respective parameter of the set of parameters of the neural network.

13. An apparatus for quantizing a neural network, the apparatus comprising:
    a memory; and
    at least one processor coupled to the memory, the at least one processor configured:
       to model noise of each parameter of a set of parameters of the neural network, the noise of each parameter indicating a probability of a value of the parameter being assigned to one grid value of a plurality of grid values in a local fixed-point quantization grid, the local fixed-point quantization grid corresponding to a scaled and offset grid of ordered values, a number of values in the grid of ordered values being based on an amount of bits used by one or both of a memory or a processor configured to execute the neural network;

to assign a grid value to a realization of each parameter of the set of parameters according to a concrete distribution that depends on the local fixed-point quantization grid and the noise modeled for the respective parameter; and to compute a fixed-point value representing each parameter of the set of parameters of a hard fixed-point quantized neural network.

14. The apparatus of claim 13, in which the at least one processor is configured to learn the local fixed-point quantization grid during training.

15. The apparatus of claim 13, in which the noise of each parameter acts additively to the respective parameter of the set of parameters of the neural network.

16. The apparatus of claim 13, in which the at least one processor is configured to assign the grid value to each parameter by creating a categorical distribution of the set of parameters over the local fixed-point quantization grid.

17. The apparatus of claim 16, in which the at least one processor is configured to assign the grid value to each parameter by selecting a maximum probability category from the categorical distribution to assign the grid value to each parameter.

18. The apparatus of claim 16, in which the at least one processor is further configured:

to replace the categorical distribution of the set of parameters over the local fixed-point quantization grid with the concrete distribution to obtain a differentiable soft quantizer; and to pseudo-quantize the parameters using the differentiable soft quantizer during training.

19. The apparatus of claim 13, in which the at least one processor is configured to compute the fixed-point value by selecting a most probable grid point from a categorical distribution of the set of parameters to form the hard fixed-point quantized neural network.

20. The apparatus of claim 13, in which the at least one processor is configured to compute the fixed-point value by selecting a most probable grid point by rounding to a nearest grid point.

21. The apparatus of claim 13, in which the set of parameters comprise at least one of weights, activations, or a combination thereof.

22. A non-transitory computer-readable medium having program code recorded thereon for quantizing a neural network, the program code executed by at least one processor and comprising:

program code to model noise of each parameter of a set of parameters of the neural network, the noise of each parameter indicating a probability of a value of the parameter being assigned to one grid value of a plurality of grid values in a local fixed-point quantization grid, the local fixed-point quantization grid corresponding to a scaled and offset grid of ordered values, a number of values in the grid of ordered values being based on an amount of bits used by one or both of a memory or a processor configured to execute the neural network;

program code to assign a grid value to a realization of each parameter of the set of parameters according to a concrete distribution that depends on the local fixed-point quantization grid and the noise modeled for the respective parameter; and program code to compute a fixed-point value representing each parameter of the set of parameters of a hard fixed-point quantized neural network.

23. The non-transitory computer-readable medium of claim 22, further comprising program code to learn the local fixed-point quantization grid during training.

24. The non-transitory computer-readable medium of claim 22, in which the noise of each parameter acts additively to the respective parameter of the set of parameters of the neural network.

25. The non-transitory computer-readable medium of claim 22, in which the program code to assign the grid value to each parameter comprises program code to create a categorical distribution of the set of parameters over the local fixed-point quantization grid.

* * * * *